US009781661B2

(12) United States Patent
Jeong et al.

(10) Patent No.: US 9,781,661 B2
(45) Date of Patent: Oct. 3, 2017

(54) ACTIVE SEARCH METHOD IN WIRELESS LAN SYSTEM

(71) Applicant: KT Corporation, Seongnam-si (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/423,952

(22) PCT Filed: Sep. 17, 2013

(86) PCT No.: PCT/KR2013/008460
§ 371 (c)(1),
(2) Date: Feb. 25, 2015

(87) PCT Pub. No.: WO2014/046491
PCT Pub. Date: Mar. 27, 2014

(65) Prior Publication Data
US 2015/0223154 A1    Aug. 6, 2015

(30) Foreign Application Priority Data

Sep. 20, 2012  (KR) .................. 10-2012-0104797
Sep. 13, 2013  (KR) .................. 10-2013-0110634

(51) Int. Cl.
*H04W 48/16*    (2009.01)
*H04W 72/04*    (2009.01)
(Continued)

(52) U.S. Cl.
CPC .......... *H04W 48/16* (2013.01); *H04L 1/1671* (2013.01); *H04L 5/0055* (2013.01);
(Continued)

(58) Field of Classification Search
CPC ....... H04W 48/16; H04W 48/14; H04W 4/08; H04W 52/02; H04W 72/0446;
(Continued)

(56) References Cited

U.S. PATENT DOCUMENTS 8,010,103 B2    8/2011   Masri
2005/0068928 A1  3/2005   Smith et al.
(Continued)

FOREIGN PATENT DOCUMENTS

KR    10-2007-0102847 A    10/2007
KR    10-2010-0072687 A    7/2010

OTHER PUBLICATIONS

Seok et al. "SIG Field of NDP Probe Request", IEEE, pp. 4-6, Sep. 17, 2012.*
(Continued)

*Primary Examiner* — Ashley Shivers
(74) *Attorney, Agent, or Firm* — Sughrue Mion, PLLC

(57) ABSTRACT

An active search method in a wireless LAN system is disclosed. The active search method comprises the steps of: transmitting, through an arbitrary channel, a preceding probe request frame for confirming the existence of an access point; acquiring, from at least one access point, a probe ACK frame that is a response to the preceding probe request frame; setting a maximum waiting time on the basis of the number of probe ACK frames; and performing an active search for an access point in the arbitrary channel for the maximum waiting time. Therefore, the waiting time for receiving a probe response frame can be reduced.

20 Claims, 15 Drawing Sheets

(51) Int. Cl.
*H04W 72/12* (2009.01)
*H04L 5/00* (2006.01)
*H04L 1/16* (2006.01)
*H04W 84/12* (2009.01)

(52) U.S. Cl.
CPC ..... *H04W 72/042* (2013.01); *H04W 72/0413* (2013.01); *H04W 72/1284* (2013.01); *H04W 72/1289* (2013.01); *H04W 84/12* (2013.01)

(58) Field of Classification Search
CPC ... H04W 74/002; H04W 84/12; H04W 48/12; H04W 24/02; H04W 24/06; H04W 28/06; H04W 72/0413; H04W 28/0273; H04W 28/065; H04W 40/34; H04W 72/046; H04W 72/12; H04W 72/121; H04W 72/1289; H04W 74/0833; H04W 88/08; H04W 72/042; H04W 72/1284; H04W 76/02; H04L 1/0061; H04L 5/0055; H04L 1/0041; H04L 1/0045; H04L 1/0063; H04L 1/0066; H04L 1/0072; H04L 1/0083; H04L 1/1614; H04L 69/22; H04L 1/0029; H04L 1/0079; H04L 1/1607; H04L 43/10; H04L 1/0073; H04L 1/1671; H04L 1/1685; H04L 1/1854; H04L 1/1864; H04L 2001/0093; H04L 2001/0097; H04L 45/74; H04L 47/10; H04L 47/56; H04L 47/826; H04L 5/0044; H04L 5/0073; H04L 69/04; H04L 1/0025; H04L 69/323

See application file for complete search history.

(56) References Cited

U.S. PATENT DOCUMENTS

| | | |
|---|---|---|
| 2005/0128988 A1 | 6/2005 | Simpson et al. |
| 2006/0111103 A1 | 5/2006 | Jeong |
| 2006/0159041 A1 | 7/2006 | Zhun |
| 2006/0203850 A1* | 9/2006 | Johnson ............... H04W 48/12 370/503 |
| 2010/0027519 A1* | 2/2010 | Chen .................... H04W 24/00 370/338 |
| 2010/0195595 A1 | 8/2010 | Iwata |
| 2012/0230308 A1* | 9/2012 | Saito .................... H04W 48/16 370/338 |
| 2013/0170345 A1* | 7/2013 | Merlin ............... H04W 28/065 370/230 |
| 2014/0003315 A1* | 1/2014 | Liu ........................ H04W 4/08 370/311 |

OTHER PUBLICATIONS

"Proposed Specification Framework for TGah D10.x", IEEE P802.11 Wireless LANs, IEEE 802.11-12/1158r0, TGah Spec Framework, Sep. 2012, pp. 1-36.

International Search Report for PCT/KR2013/008460 dated Dec. 16, 2013 [PCT/ISA/210].

Written Opinion for PCT/KR2013/008460 dated Dec. 16, 2013 [PCT/ISA/237].

* cited by examiner

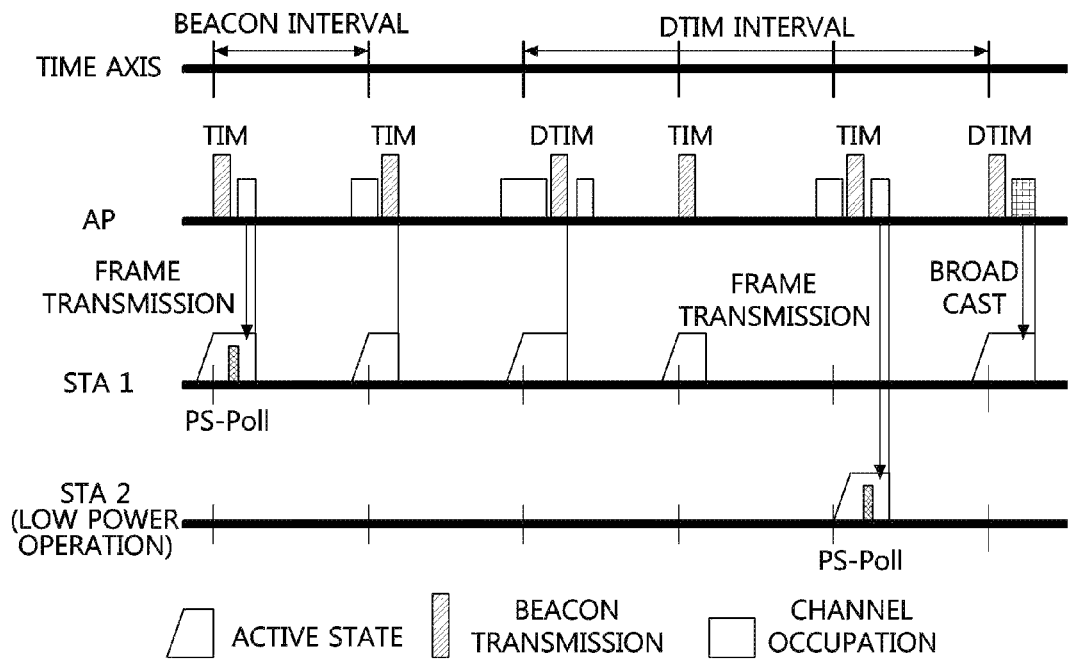

| Order | Information | Notes |
|---|---|---|
| 1 | SSID | |
| 2 | Supported rates | |
| 3 | Request information | May be included if dot11MultiDomainCapabilityEnabled is true. |
| 4 | Extended Supported Rates | The Extended Supported Rates element is present whenever there are more than eight supported rates, and it is optional otherwise. |
| Last | Vendor Specific | One or more vendor-specific information elements may appear in this frame. This information element follows all other information elements. |

FIG. 5

| Order | Information | Notes |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |
| 10 | Country | Included if dot11MultiDomainCapabilityEnabled or dot11SpectrumManagementRequired is true. |
| 11 | FH Parameters | FH Parameters, as specified in 7.3.2.10, may be included if dot11MultiDomainCapabilityEnabled is true. |
| 12 | FH Pattern Table | FH Pattern Table information, as specified in 7.3.2.11, may be included if dot11MultiDomainCapabilityEnabled is true. |
| 13 | Power Constraint | Shall be included if dot11SpectrumManagementRequired is true. |
| 14 | Channel Switch Announcement | May be included if dot11SpectrumManagementRequired is true. |

FIG. 6

| Order | Information | Notes |
|---|---|---|
| 15 | Quiet | May be included if dot11SpectrumManagementRequired is true. |
| 16 | IBSS DFS | Shall be included if dot11SpectrumManagementRequired is true in an IBSS. |
| 17 | TPC Report | Shall be included if dot11SpectrumManagementRequired is true. |
| 18 | ERP Information | The ERP Information element is present within Probe Response frames generated by STAs using ERPs and is optionally present in other cases. |
| 19 | Extended Supported Rates | The Extended Supported Rates element is present whenever there are more than eight supported rates, and it is optional otherwise. |
| 20 | RSN | The RSN information element is only present within Probe Response frames generated by STAs that have dot11RSNAEnabled set to TRUE. |
| 21 | BSS Load | The BSS Load element is present when dot11QosOption- Implemented and dot11QBSSLoadImplemented are both true. |
| 22 | EDCA Parameter Set | The EDCA Parameter Set element is present when dot11QosOptionImplemented is true. |
| Last–1 | Vendor Specific | One or more vendor-specific information elements may appear in this frame. This information element follows all other information elements, except the Requested Information elements. |
| Last–n | Requested information elements | Elements requested by the Request information element of the Probe Request frame. |

ACTIVE SEARCH METHOD IN WIRELESS LAN SYSTEM

TECHNICAL FIELD

The present invention relates to an active scanning method, and more particularly, to an active scanning method for scanning an access point in a wireless local area network (WLAN) system.

BACKGROUND ART

Various wireless communication techniques are being developed with the development of an information communication technology. Among the techniques, wireless local area network (WLAN) is a technology that can provide a wireless connection to the Internet in a limited service area such as a home or office building using portable terminals, for example, a personal digital assistant (PDA), a laptop computer, and a portable multimedia player (PMP) based on a wireless frequency technology.

A standard for WLAN technology is developed as the Institute of Electrical and Electronics Engineering (IEEE) 802.11 standard. IEEE 802.11a provides a transfer rate of 54 Mbps using 5 GHz unlicensed band. IEEE 802.11b provides a transfer rate of 11 Mbps by using direct sequence spread spectrum (DSSS) in 2.4 GHz band. IEEE 802.11g provides a transfer rate of 54 Mbps by using orthogonal frequency division multiplexing (OFDM) in 2.4 GHz band. IEEE 802.11n provides a transfer rate of 300 Mbps for two spatial streams by using multiple-input multiple-output OFDM (MIMO-OFDM). IEEE 802.11n supports a channel bandwidth of up to 40 MHz and, in this case, provides a transfer rate of 600 Mbps.

With the wide deployment of WLAN and the diversification of applications using WLAN, new WLAN techniques are increasingly needed to support higher throughput than IEEE 802.11n. Very high throughput (VHT) WLAN is one of IEEE 802.11 WLAN techniques, which is proposed to support a data processing rate of 1 Gbps or more. In particular, IEEE 802.11ac is developed as a standard for providing a very high throughput on the 5 GHz band, and IEEE 802.11ad is developed as a standard for providing a very high throughput on the 60 GHz band.

In a system based on the WLAN technology, when a terminal scans an access point through an active scanning scheme, the terminal transmits a probe request frame, and the access point transmits a probe response frame in response to the probe request frame. In an environment in which there are a plurality of terminals and a plurality of access points, each of the terminals transmits its own probe request frame, and each of the access points transmits a probe response frame in response to the probe request frame. That is, a large number of probe request frames and probe responses frames are generated, which occupy many wireless channels. Accordingly, the terminal is required to wait while keeping awake for a long time in order to receive the probe response frame from the access point.

DISCLOSURE

Technical Problem

The present invention is directed to providing an active scanning method for quickly scanning presence of an access point.

The present invention is also directed to providing a method of responding to active scanning in order to quickly scan the presence of the access point.

Technical Solution

One aspect of the present invention provides an active scanning method including transmitting a prior probe request frame for checking presence of an access point through any channel, acquiring probe ACK frames, each of which is a response to the prior probe request frame, from at least one access point, setting a max waiting time based on the number of probe ACK frames, and performing active scanning of the access point on the channel for the max waiting time.

The method may further include transmitting the prior probe request frame on a channel other than the channel after the max waiting time.

The method may further include transmitting the prior probe request frame on a channel other than the channel after receiving all of frame probe response frames corresponding to the number of probe ACK frames.

The setting of the max waiting time may include setting the max waiting time in proportion to the number of probe ACK frames.

The prior probe request frame may be a null data packet (NDP) frame.

The prior probe request frame may include identifier (ID) information of the access point.

The acquiring of the probe ACK frame may include selecting a probe ACK frame that has a signal strength greater than or equal to a predetermined signal strength from among the acquired probe ACK frames.

Another aspect of the present invention provides a method of responding to active scanning, the method including: acquiring a prior probe request frame from a terminal, generating a probe ACK frame that is a response to the prior probe request frame and transmitting the probe ACK frame.

The method may further include acquiring a probe request frame from the terminal and transmitting a probe response frame in response to the probe request frame.

The generating of the probe ACK frame may include generating the probe ACK frame when identifier (ID) information of the access point is included in the prior probe request frame.

The prior probe request frame may be an NDP frame.

The prior probe request frame may include identifier (ID) information of at least one access point.

The probe ACK frame may include transmission time information of a beacon frame transmitted from the access point.

Still another aspect of the present invention provides an active scanning method including transmitting a prior probe request frame for checking presence of an access point through any channel, receiving a probe ACK frame that is a response to the prior probe request frame from at least one access point, and acquiring transmission time information of a beacon frame included in the probe ACK frame.

The method may further include transmitting the prior probe request frame on a channel other than the channel before the transmission time of the beacon frame.

The method may further include receiving the beacon frame from the access point at the transmission time of the beacon frame.

The prior probe request frame may be an NDP frame.

The prior probe request frame may include identifier information of the access point.

Advantageous Effects

According to an embodiment of the present invention, the terminal may check in advance the presence of the access point through the process of transmitting the prior probe request frame and receiving the probe ACK frame, thereby reducing a waiting time to receive the probe response frame from the access point.

In addition, the terminal may predict in advance the number of probe response frames through the process of transmitting the prior probe request frame and receiving the probe ACK frame and thus need not wait until the max waiting time, thereby reducing a waiting time to receive the probe response frame.

Furthermore, the terminal may be aware of a wireless signal quality of each access point through the process of transmitting the prior probe request frame and receiving the probe ACK frame and may perform active scanning of the access point having a good wireless signal quality. Thus, the terminal may reduce a scanning time of the access point and prevent the probe response frame from being transmitted from an access point having a bad wireless signal quality, thereby enhancing efficiency of the wireless channel.

In addition, the terminal may recognize in advance a transmission time of a beacon frame through the process of transmitting the prior probe request frame and receiving the probe ACK frame, thereby receive the beacon frame at the recognized time.

DESCRIPTION OF DRAWINGS

FIG. 3 is a concept view showing a data transmission process for an access point according to an embodiment of the present invention.

FIG. 4 is a conceptual view showing a configuration of a frame request frame.

FIG. 5 is a conceptual view showing a configuration (1 to 14) of a frame response frame.

FIG. 6 is a conceptual view showing a configuration (15 to last-n) of a frame response frame.

MODES OF THE INVENTION

Figure 1:
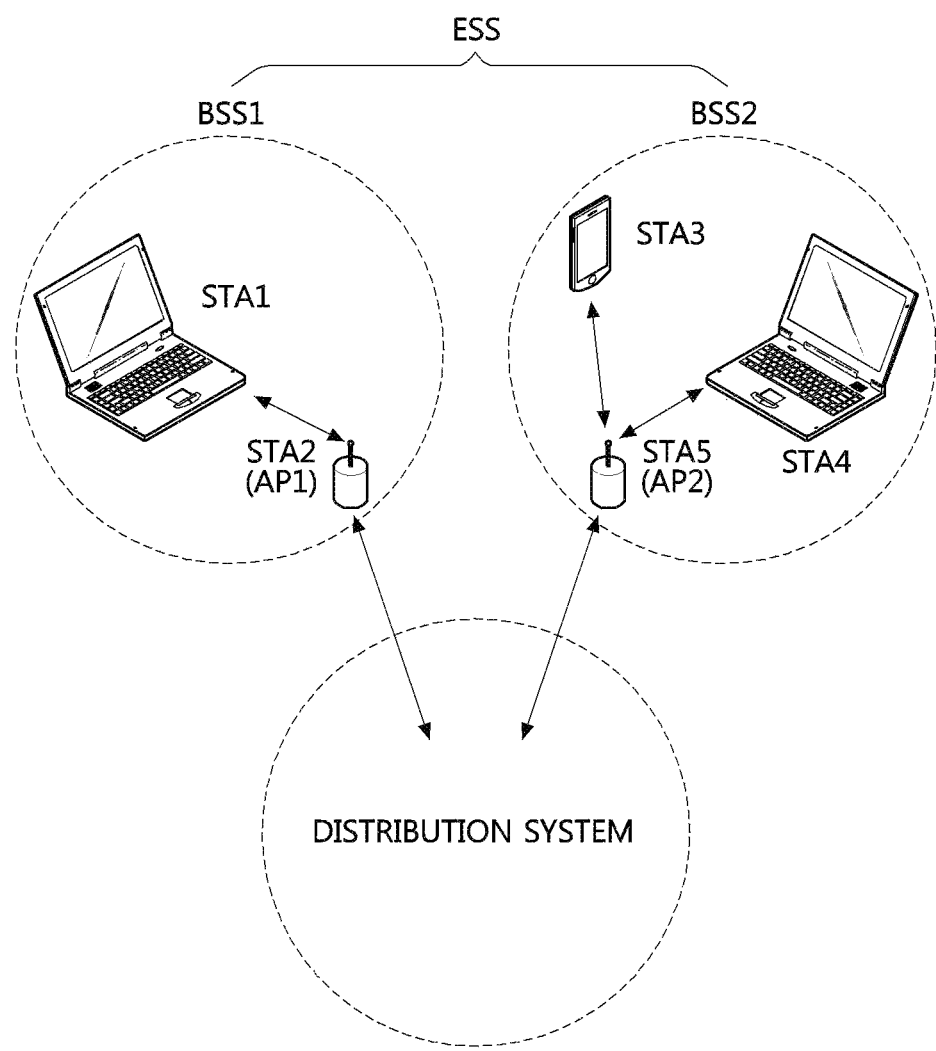
FIG. 1 is a concept view showing a configuration of an IEEE 802.11 WLAN system according to an embodiment of the present invention.

Since the present invention may be variously modified and have several exemplary embodiments, specific exemplary embodiments will be shown in the accompanying drawings and be described in detail in a detailed description.

However, it should be understood that the present invention is not limited to these embodiments, and may include any and all modification, variations, equivalents, substitutions and the like within the spirit and scope thereof.

The terms used in the present specification are set forth to explain the embodiments of the present invention, and the scope of the present invention is not limited thereto. The singular number includes the plural number as long as they are not apparently different from each other in meaning. In the present specification, it will be understood that the terms "have," "comprise," "include," and the like are used to designate features, figures, steps, operations, components, parts or combination thereof, and do not exclude them.

Unless otherwise defined, all terms (including technical and scientific terms) used herein have the same meaning as commonly understood by one of ordinary skill in the art to which this invention belongs. Terms, such as terms that are generally used and have been in dictionaries, should be construed as having meanings matched with contextual meanings in the art. In this description, unless defined clearly, terms are not ideally, excessively construed as formal meanings.

Hereinafter, preferred embodiments of the present invention will be described in detail with reference to the accompanying drawings. In describing the invention, in order to facilitate the entire understanding of the invention, like numbers refer to like elements throughout the description of the figures and the repetitive description thereof will be omitted.

Throughout this specification, a station (STA) denotes any functional medium including a physical layer interface for a wireless medium and a medium access control (MAC) that conforms to an Institute of Electrical and Electronics Engineers (IEEE) 802.11 standard. The station (STA) may be classified into a station (STA) that is an access point (AP) and a station (STA) that is a non-AP. The station (STA) that is an AP may be simply called an access point (AP), and the station (STA) that is a non-AP is simply called a terminal.

The station (STA) includes a processor and a transceiver, and may further include a user interface and a display device. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

The AP may be called a convergence controller, a base station (BS), a node-B, an eNode-B, a base transceiver system (BTS), or a site controller, and may include some or all of functions thereof.

The terminal may be called a wireless transmit/receive unit (WTRU), a user equipment (UE), a user terminal (UT), an access terminal (AT), a mobile station (MS), a mobile terminal, a subscriber unit, a subscriber station (SS), a wireless device, a mobile subscriber unit, or the like and may include some or all of functions thereof.

Here, the terminal may include a communication enabled desktop computer, laptop computer, tablet PC, wireless phone, mobile phone, smartphone, e-book reader, portable multimedia player (PMP), portable gaming console, navigation device, digital camera, digital multimedia broadcasting (DMB) player, digital audio recorder, digital audio player, digital picture recorder, digital picture player, digital video recorder, digital video player, etc.

FIG. 1 is a concept view showing a configuration of an IEEE 802.11 WLAN system according to an embodiment of the present invention.

Referring to FIG. 1, the IEEE 802.11 WLAN system includes at least one basic service set (BSS). The BBS denotes a set of stations STA 1, STA 2(AP 1), STA 3, STA 4, and STA 5(AP 2) that may be successfully synchronized to communicate with one another, but does not denote a certain region.

The BBS may be classified into an infrastructure BSS and an independent BSS (IBSS), and BBS 1 and BBS 2 denote the infrastructure BSS. BBS 1 may include a terminal STA 1, an access point STA 2(AP 1) that provides a distribution service, and a distribution system (DS) that connects a plurality of access points STA 2(AP 1) and STA 5(AP 2). In BSS 1, the access point STA 2(AP 1) manages the terminal STA 1.

BBS 2 may include terminals STA 3 and STA 4, an access point STA 5(AP 2) that provides a distribution service, and a distribution system that connects a plurality of access points STA 2(AP 1) and STA 5(AP 2). In BSS 2, the access point STA 5(AP 2) manages the terminals STA 3 and STA 4.

The independent BSS (IBSS) is a BSS that operates in an ad-hoc mode. Since the IBSS does not include an access point, the IBSS does not include a centralized management entity for performing a central management function. That is, in the IBSS, terminals are managed in a distributed manner. The IBSS is a self-contained network, in which all terminals may be mobile terminals and may be disallowed to access the distribution system (DS).

The access points STA 2(AP 1) and STA 5(AP 2) provide a connection to the DS through a wireless medium for their associated terminals STA 1, STA 3, and STA 4. In BSS 1 or BSS 2, generally, communication between the terminals STA 1, STA 3, and STA 4 is made through the access points STA 2(AP 1) and STA 5(AP 2). When a direct link is set, a direct communication between the terminals STA 1, STA 3, and STA 4 is enabled.

A plurality of infrastructure BBSs may be interconnected through the DS. The plurality of BBSs connected to each other through the DS are called an extended service set (ESS). STAs included in the ESS may communicate with each other, and within the same ESS, the STAs may move from one BSS to another BSS while communicating in a seamless manner.

The DS is a mechanism in which one AP communicates with another AP. By using the DS, an AP may transmit a frame to terminals that are associated with a BSS managed by the AP, or transmit a frame to a terminal that has moved to another BSS. In addition, the AP may transmit and receive a frame to and from an external network such as a wired network. The DS need not necessarily be a network, and has no limitation in form as long as a predetermined distribution service specified in the IEEE 802.11 can be provided. For example, the DS may be a wireless network such as a mesh network, or may be a physical structure for interconnecting APs.

An active scanning method according to an embodiment of the present invention, which will be described below, may be applied to the above IEEE 802.11 WLAN system and also various networks such as a wireless personal area network (WPAN), a wireless body area network (WBAN), and so on.

Figure 2:
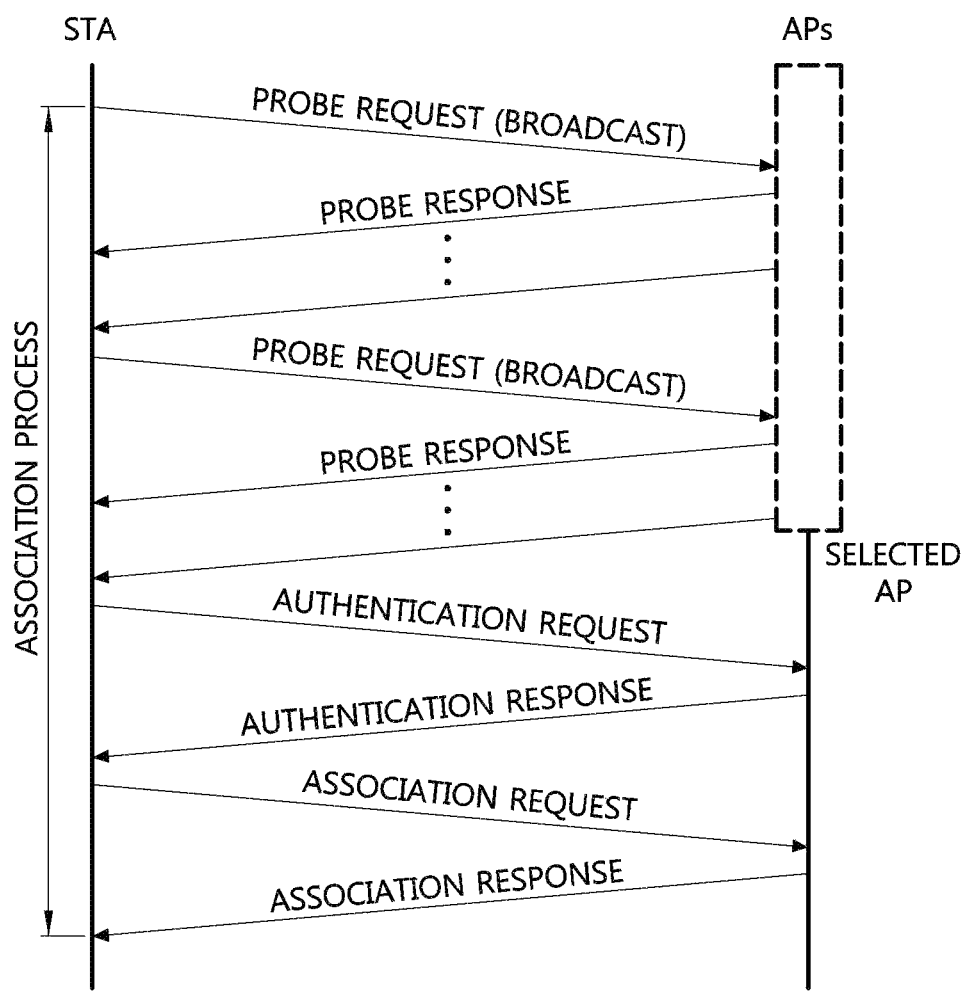
FIG. 2 is a conceptual view showing an association process for a terminal in an infrastructure BSS.

FIG. 2 is a conceptual view showing an association process for a terminal in an infrastructure BSS.

In order for a terminal STA to transmit and receive data in an infrastructure BSS, first, the terminal STA should be associated with an AP.

Referring to FIG. 2, the association process of the terminal STA in the infrastructure BSS may include: 1) probe step of probing an AP, 2) authentication step of authenticating the probed AP, and 3) association step of associating with the authenticated AP.

First, the terminal STA may probe neighboring APs through the probe process. The probe process includes a passive scanning method and an active scanning method. The passive scanning method may be performed by overhearing beacons that are transmitted by the neighboring APs. In contrast, the active scanning method may be performed by broadcasting a probe request frame. Upon receiving the probe request frame, the AP may transmit a probe response frame corresponding to the probe request frame to the terminal STA. The terminal STA may check the presence of the neighboring APs by receiving the probe response frame.

Subsequently, the terminal STA performs authentication with the probed APs, and may perform the authentication with a plurality of APs. An authentication algorithm conforming to the IEEE 802.11 standard includes an open system algorithm that exchanges two authentication frames and a shared key algorithm that exchanges four authentication frames. Through a process of exchanging the authentication request frame and the authentication response frame based on the authentication algorithm, the terminal STA may perform authentication with the AP.

Last, the terminal STA selects one AP from among the authenticated plurality of APs and performs an association process with the selected AP. That is, the terminal STA transmits an association request frame to the selected AP. Upon receiving the association request frame, the AP transmits the terminal STA to an association response frame corresponding to the association request frame. As such, through the process of exchanging the association request frame and the association response frame, the terminal STA may perform the association process with the AP.

FIG. 3 is a concept view showing a data transmission process for an access point according to an embodiment of the present invention.

Referring to FIG. 3, the AP broadcasts a beacon periodically and may broadcast a beacon including the DTIM at every 3 beacon intervals. The terminals STA 1 and STA2 periodically wake up from a power save mode (PSM) and receive the beacon, and check the TIM or DTIM included in the beacon to determine whether the data to be transmitted to the terminal is buffered in the AP. In this case, when there is the buffered data, the terminals STA 1 and STA 2 maintain awake and receive the data from the AP. When there is no buffered data, the terminals STA 1 and STA 2 return to the PSM (that is, a doze state).

That is, when a bit in the TIM corresponding to an AID of the terminal STA 1 or STA 2 is set as 1, the terminal STA 1 or STA 2 transmits, to the AP, a power save (PS)-Poll frame (or a trigger frame) that informs the AP that the terminal STA is awake and ready to receive data. The AP may determine that the terminal STA 1 or STA 2 is ready to receive the data by receiving the PS-Poll frame and then may transmit the data or an acknowledgement (ACK) to the terminal STA 1 or STA 2. When the AP transmits the ACK to the terminal STA 1 or STA 2, the AP transmits data to the terminal STA 1 or STA 2 at an appropriate time. On the other hand, when the bit in the TIM corresponding to the AID of the terminal STA 1 or STA 2 is set as 0, the terminal STA 1 or STA 2 returns to the PSM.

A method of scanning an access point is classified into an active scanning method and a passive scanning method. In the active scanning method, a terminal transmits a probe request frame and an access point transmits a probe response frame in response to the probe request frame upon receiving the probe request frame.

FIG. 4 is a conceptual view showing a configuration of the frame request frame.

Referring to FIG. 4, the probe request frame may include a service set identifier (SSID), supported rates, request information, extended supported rates, vendor specific information, and so on.

FIG. 5 is a conceptual view showing a configuration (1 to 14) of the frame response frame, and FIG. 6 is a conceptual view showing a configuration (15 to last-n) of the frame response frame.

Referring to FIGS. 5 and 6, the probe response frame includes a lot of information, and thus occupies a wireless channel for a long time. In an environment in which there are a plurality of access points and a plurality of terminals, the terminals generate a lot of probe request frames, and the access points generate a lot of probe response frames in response to the generated probe request frames. The probe request frames and the probe response frames occupy the wireless channel for a long time. In addition, since it is not easy for the terminal to receive the probe response frame from a desired access point in a short time and the terminal should stay awake for a long time in order to scan a desired access point, the terminal receives the probe response frame from an undesired access point for this time.

Figure 7:
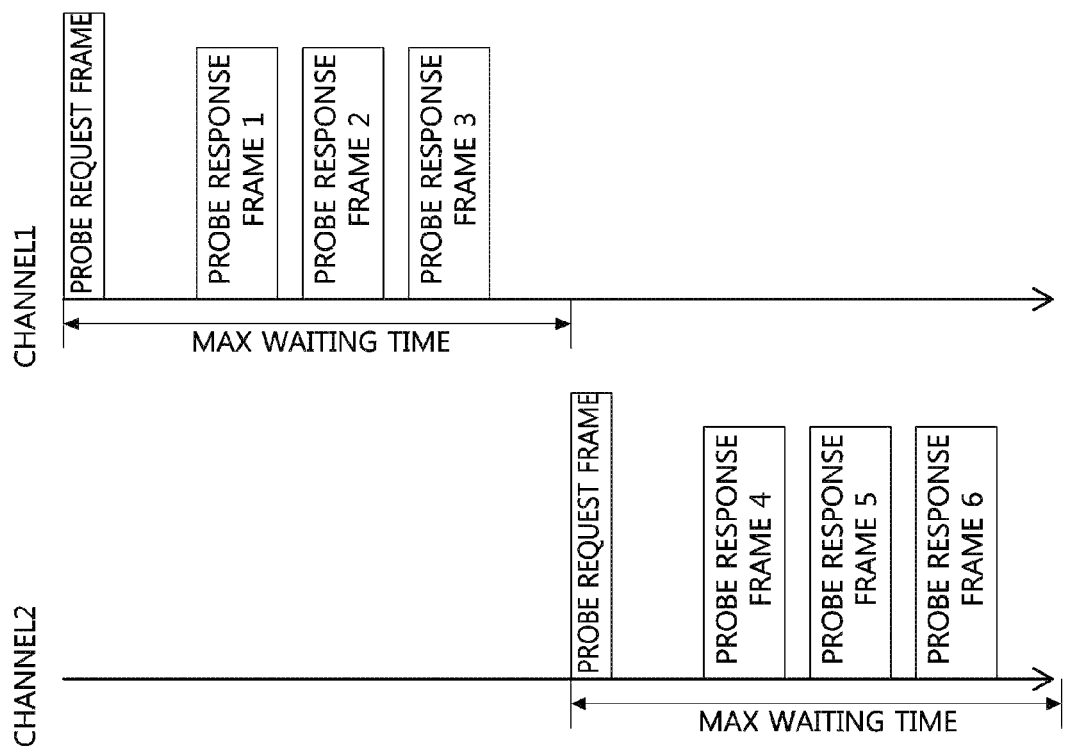
FIG. 7 is a conceptual view showing an embodiment of an active scanning method in a multi-channel.

FIG. 7 is a conceptual view showing an embodiment of an active scanning method in a multi-channel.

Referring to FIG. 7, since the terminal does not know in which channel the desired access point is present, the terminal may sequentially perform the same active scanning process in each channel. The terminal may transmit the probe request frame on channel 1 and wait for a max waiting time to receive the probe response frame that is a response to the probe request frame. After waiting for the max waiting time on channel 1, the terminal may move to channel 2 to perform an active scanning process (that is, transmission of probe request frame-reception of probe response frame).

Figure 8:
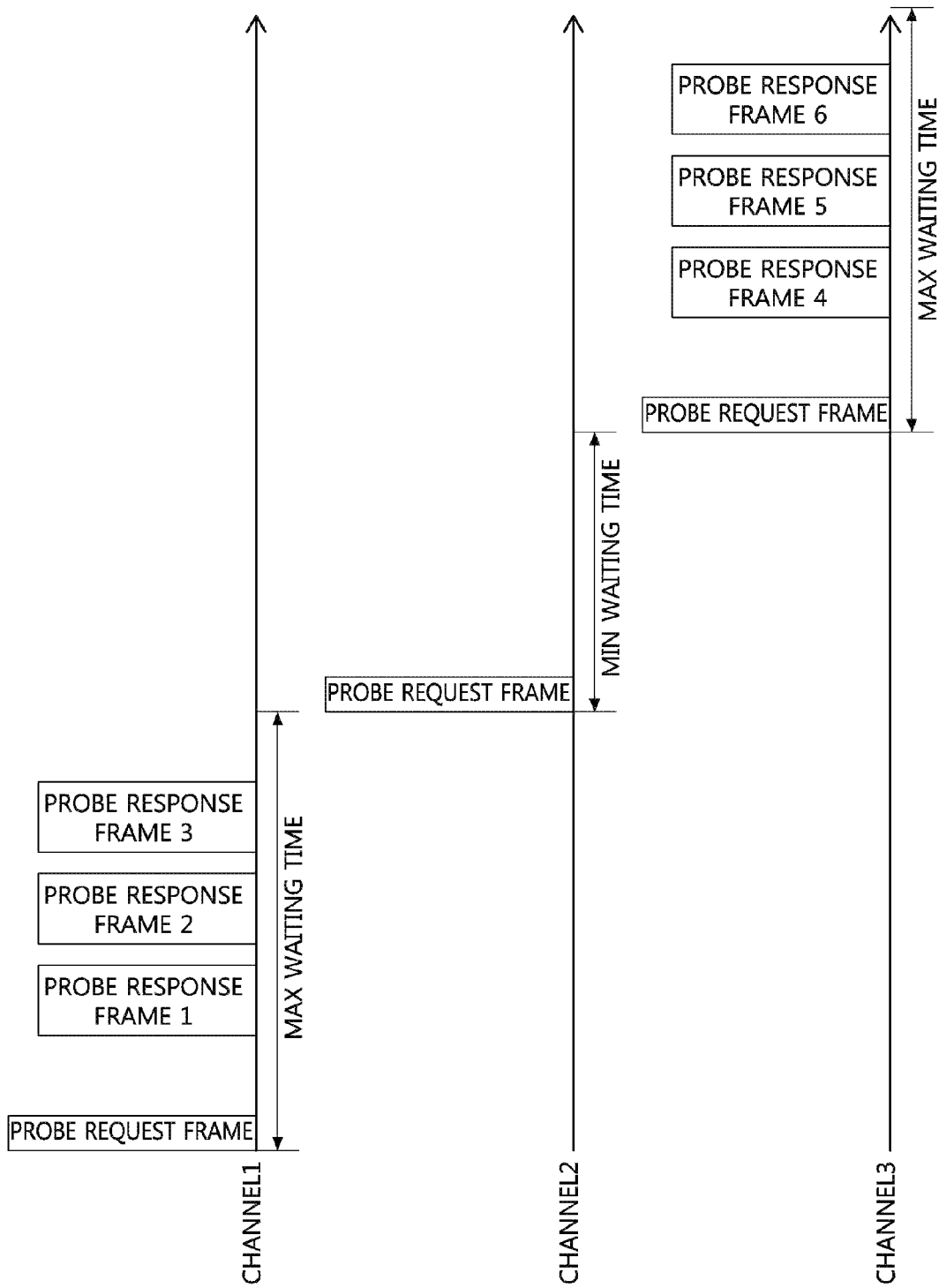
FIG. 8 is a conceptual view showing another embodiment of an active scanning method in a multi-channel.

FIG. 8 is a conceptual view showing another embodiment of an active scanning method in a multi-channel.

Referring to FIG. 8, the terminal waits for a min waiting time in a corresponding channel even when the terminal does not receive the probe response frame after transmitting the probe request frame. In contrast, when the terminal receives at least one probe response frame, the terminal should wait for the max waiting time in a corresponding channel. The terminal should wait for the min waiting time in order to receive the probe response frame even in a channel in which any access point is not present, causing unnecessary time consumption.

Figure 9:
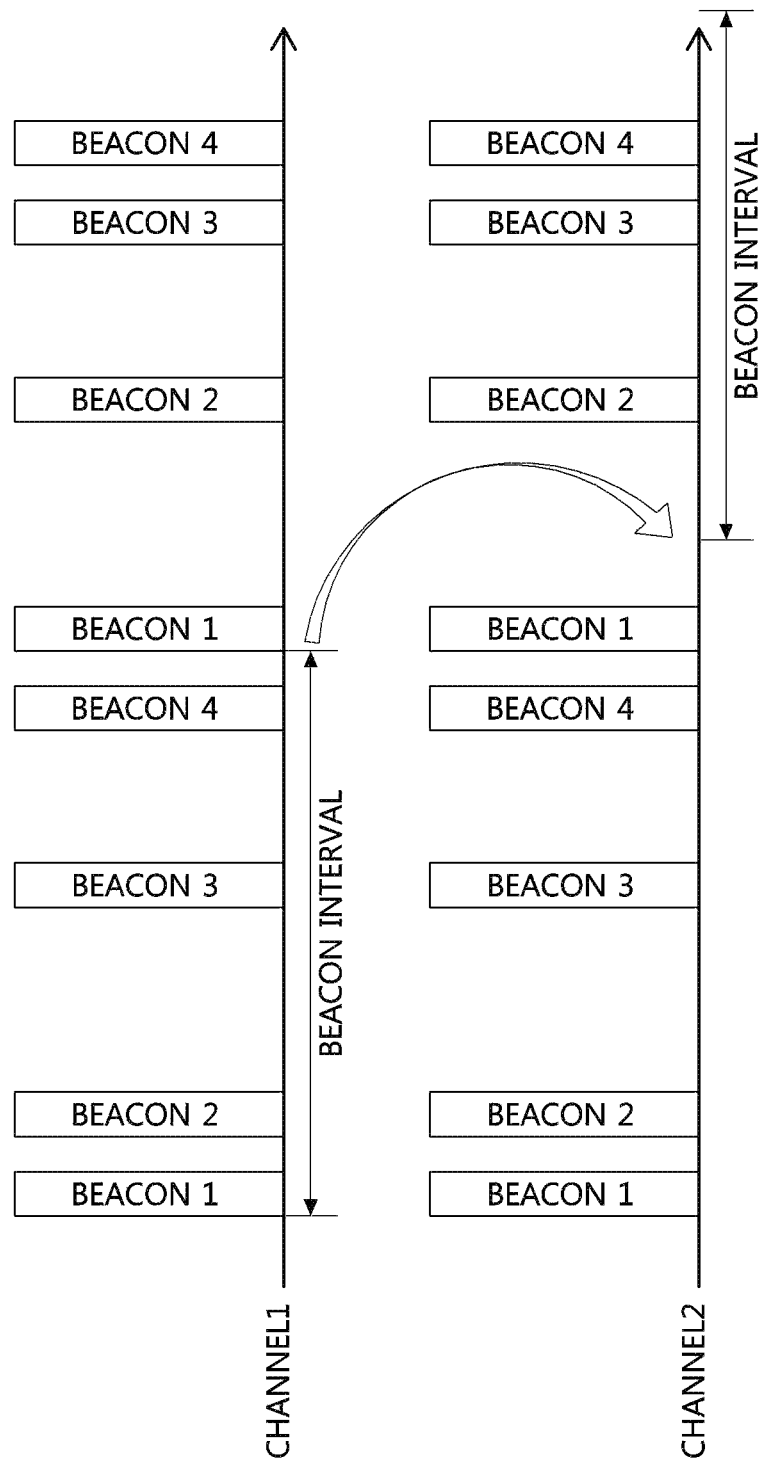
FIG. 9 is a conceptual view showing an embodiment of a passive scanning method in a multi-channel.

FIG. 9 is a conceptual view showing an embodiment of a passive scanning method in a multi-channel.

Referring to FIG. 9, since the terminal cannot know a transmission time of a beacon, the terminal should receive the beacon for a sufficiently long time and move to another channel. That is, the terminal may wait for a beacon interval in channel 1 in order to receive the beacon and may move to channel 2 and receive a beacon after the beacon interval.

Figure 10:
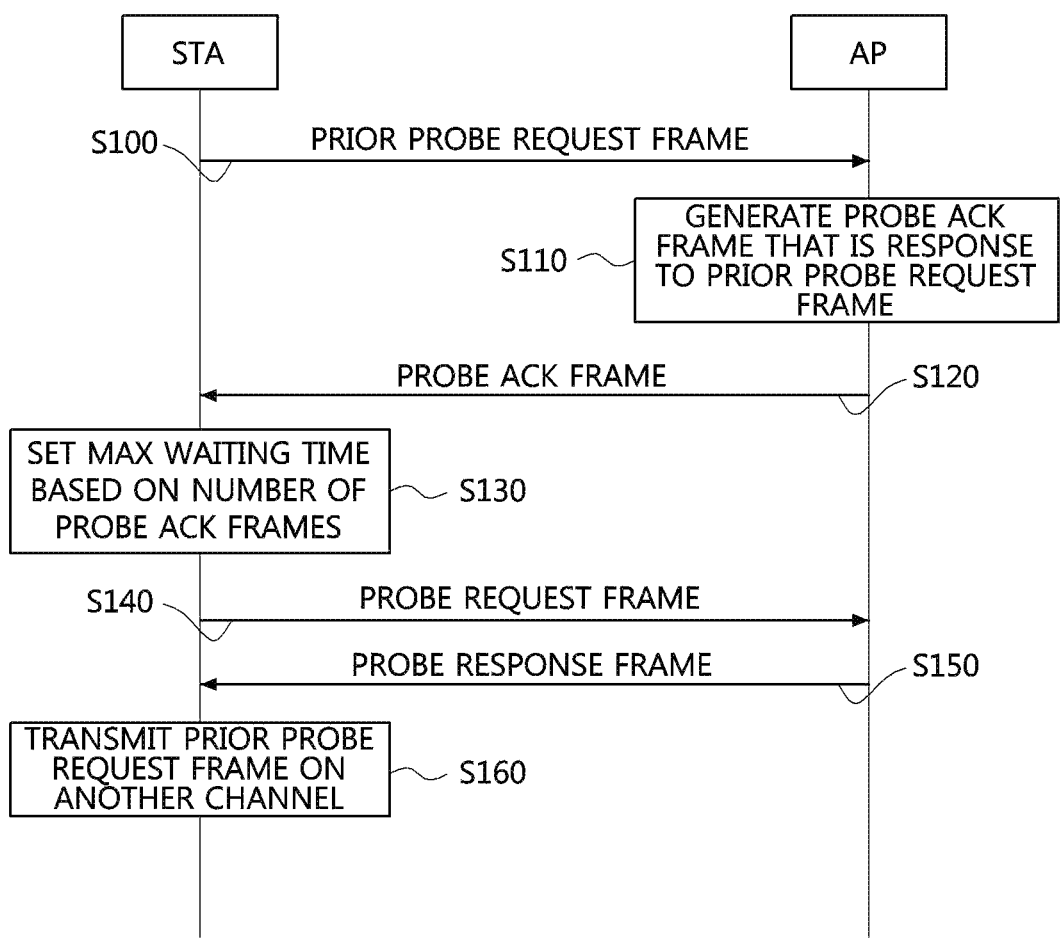
FIG. 10 is a flowchart showing an active scanning method according to an embodiment of the present invention.

FIG. 10 is a flowchart showing an active scanning method according to an embodiment of the present invention.

Referring to FIG. 10, the terminal STA may transmit a prior probe request frame for checking the presence of the access point through any channel (S100). The prior probe request frame may denote a newly defined management frame and denote a frame different from the probe request frame shown in FIG. 4.

The prior probe request frame may be used to check whether the access point is present on the channel or used to request a beacon transmission time. Accordingly, the prior probe request frame may be simply configured using information other than complicated information included in the existing probe request frame (see FIG. 4). For example, the prior probe request frame may be configured in the form of a null data packet (NDP) frame.

In order to check whether a specific access point is present in a channel, the prior probe request frame may include an identifier of the access point (for example, an SSID, a compressed SSID, a basic service set identification (BSSID), etc.). Here, the compressed SSID may denote an SSID to which a hash algorithm is applied. The identifier (ID) of the access point may be included in the prior probe request frame alone or in the form of a list. If the identifier of the access point is not included in the prior probe request frame, this may mean that the presence of all access points should be checked.

When the prior probe request frame is used to request transmission time information of a beacon (or an auxiliary beacon) that is transmitted from the access point, the prior probe request frame may be configured the same as described above. That is, by adding the identifier of the specific access point to the prior probe request frame, beacon transmission time information of the access point may be requested. Here, the auxiliary beacon (that is, a short beacon) includes only information necessary for scanning unlike the existing beacon, and have a transmission period shorter than the existing beacon.

The AP may generate a probe ACK frame that is a response to the prior probe request frame upon receiving the prior probe request frame from the terminal STA (S110). In this case, the AP may generate the probe ACK frame when its own identifier is the same as the identifier of the access point included in the prior probe request frame. Alternatively, the AP may generate the probe ACK frame when the prior probe request frame includes no identifiers of access points.

The AP may generate a probe ACK frame including its own beacon transmission time information and may generate a probe ACK frame including its own identifier (for example, an SSID).

The probe ACK frame is used to inform of the presence (or the beacon transmission time information) of the AP, and denotes a simple response to reception of the prior probe request frame unlike the existing probe response frame (see FIGS. 5 and 6).

The AP may transmit the probe ACK frame as a response to the prior probe request frame (S120). In this case, the AP may set transmission priority of the probe ACK frame higher than other management frames or data frames and transmit the probe ACK frame. For example, the AP may increase the transmission priority of the probe ACK frame by adjusting enhanced distributed channel access (EDCA) parameters. That is, the AP may set a short arbitration interframe space (AIFS), a small minimum of a contention window (CWmin), and a small maximum of the contention window (CWmax) and transmit the probe ACK frame. When the EDCA parameters are set as described above, the AP may transmit the probe ACK frame within a short time window.

APs may compete for channel access in order to transmit the probe ACK frame that is the prior probe request frame. In this case, the APs may sequentially transmit the probe ACK frame according to a backoff operation. When the APs are aware of transmission of the probe ACK frame from one AP, the APs may stop transmitting their own probe ACK frame.

The terminal STA may receive the probe ACK frame transmitted from the AP (S120). In this case, the terminal STA may receive the probe ACK frame for a prior waiting time that is shorter than the max waiting time. Here, the max waiting time denotes a waiting time to receive the existing probe response time (see FIGS. 5 and 6), and the prior waiting time denotes a waiting time to receive the probe ACK frame. Since the probe ACK frame has a smaller size than the probe response frame, the terminal STA may set the prior waiting time shorter than the max waiting time. In addition, the terminal STA may set the prior waiting time to be further short such that only some probe ACK frames may be received.

When a plurality of probe ACK frames are received, the terminal STA may measure signal strengths of the plurality of probe ACK frames, select a frame ACK frame having a predetermined signal strength or greater from among the plurality of probe ACK frames, and choose an access point that has transmitted the selected probe ACK frame to an access point to be connected (hereinafter referred to as a connection target access point). In next steps, the terminal STA may transmit a probe request frame including an identifier of the connection target access point.

The terminal STA may set the max waiting time based on the number of received ACK frames (S130). That is, the number of probe ACK frames denotes the number of access points that are present on a channel, which denotes the number of frame response frames to be transmitted. Accordingly, the terminal STA may set the max waiting time such that a predicted number of probe response frames may be received. For example, the terminal may set the max waiting time to be relatively long when the number of received probe ACK frames is large and set the max waiting time to be relatively short when the number of received probe ACK frames is small.

The terminal STA may transmit the probe request frame (S140) and receive the probe response frame that is a response to the probe request frame (S150). That is, the terminal STA may receive the probe response frame for the max waiting time that is set through step S130.

After the max waiting time, the terminal STA may move to another channel to perform an active scanning process (that is, transmission of prior probe request frame-reception of probe ACK-transmission of probe request frame-reception of probe response frame) (S160). When all the predicted number of probe response frames are received even before the max waiting time, the terminal STA may move to another channel and perform an active scanning process.

Figure 11:
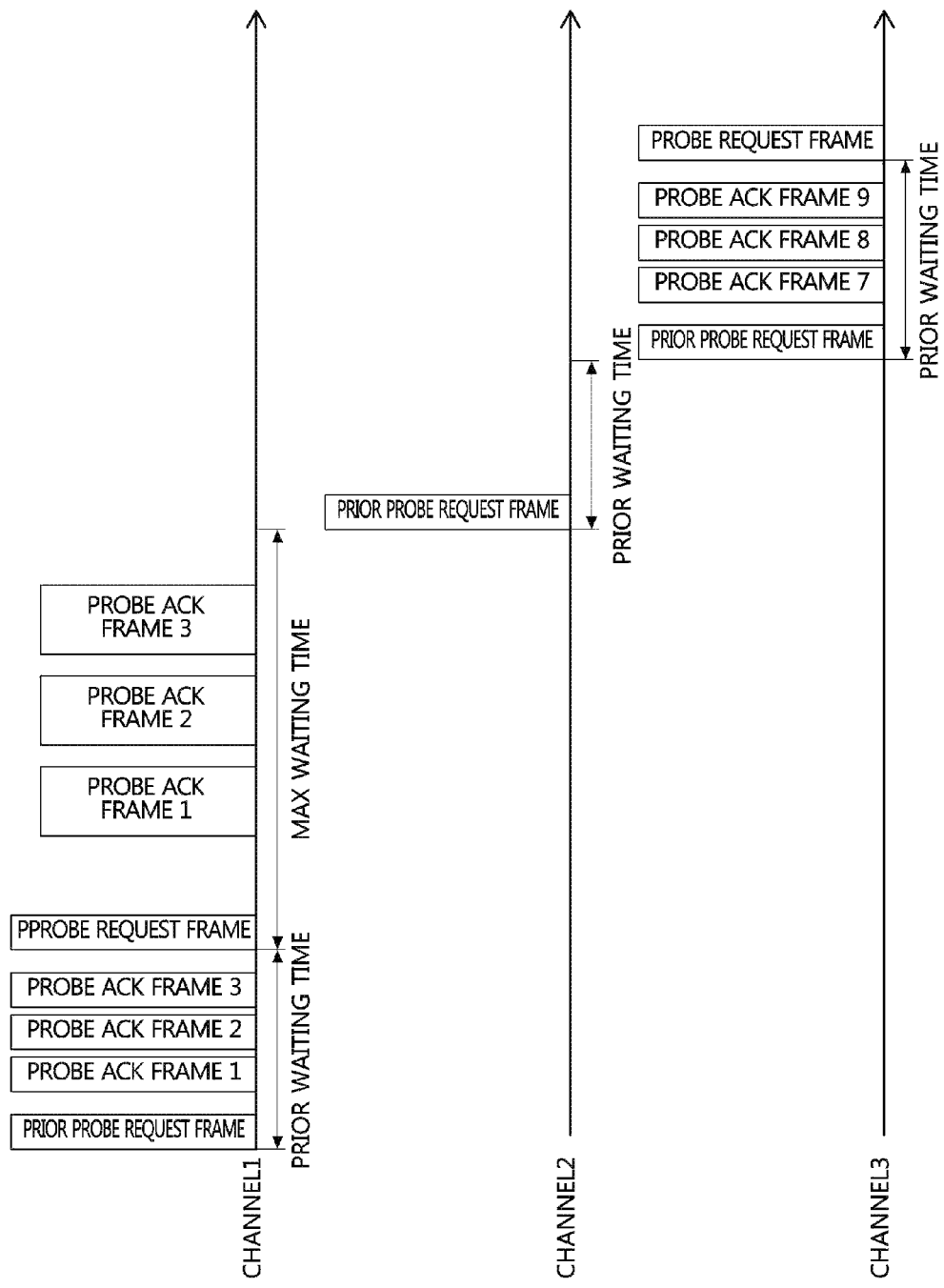
FIG. 11 is a conceptual view showing a first embodiment of an active scanning method.

FIG. 11 is a conceptual view showing a first embodiment of an active scanning method.

Referring to FIG. 11, a terminal may transmit a prior probe request frame on channel 1 and receive a probe ACK frame that is a response to the prior probe request frame for a prior waiting time. The terminal may predict that three probe response frames will be transmitted because three probe ACK frames are received. Accordingly, the terminal may set the max waiting time such that the three probe response frames may be received.

The terminal may transmit the probe request frame on channel 1 and receive the probe response frame that is a response to the probe request frame for the set max waiting time. After the max waiting time, the terminal may move to channel 2 and transmit the prior probe request frame.

Since the terminal does not receive the probe ACK frame that is a response to the prior probe request frame for the prior waiting time on channel 2, the terminal may move to channel 3 after the prior waiting time. The terminal may perform the above active scanning process (that is, transmission of prior probe request frame-reception of probe ACK frame-transmission of probe request frame-reception of probe response frame) on channel 3.

Figure 12:
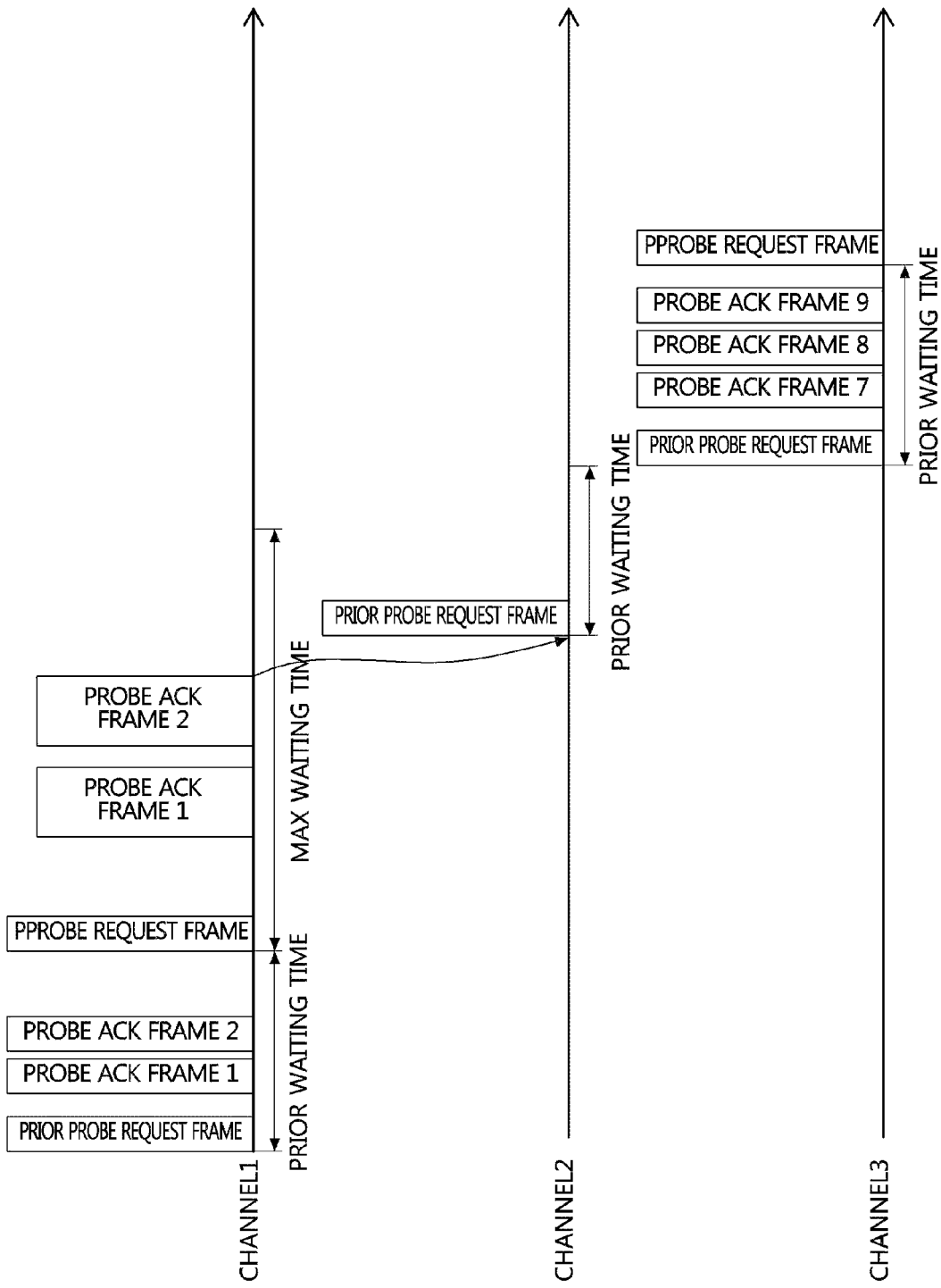
FIG. 12 is a conceptual view showing a second embodiment of an active scanning method.

FIG. 12 is a conceptual view showing a second embodiment of an active scanning method.

Referring to FIG. 12, a terminal may transmit a prior probe request frame on channel 1 and receive a probe ACK frame that is a response to the prior probe request frame for a prior waiting time. The terminal may predict that two probe response frames will be transmitted because two probe ACK frames are received. Accordingly, the terminal may set the max waiting time such that the two probe response frames may be received.

The terminal may transmit the probe request frame on channel 1 and receive the probe response frame that is a response to the probe request frame for the set max waiting time. When all of the two probe response frames are received even before the max waiting time, the terminal may move to channel 2 and perform the active scanning process.

The terminal may transmit the prior probe request frame on channel 2. Since the terminal does not receive the probe ACK frame that is a response to the prior probe request frame for the prior waiting time on channel 2, the terminal may move to channel 3 after the prior waiting time. The terminal may perform the above active scanning process (that is, transmission of prior probe request frame-reception of probe ACK frame-transmission of probe request frame-reception of probe response frame) on channel 3.

Figure 13:
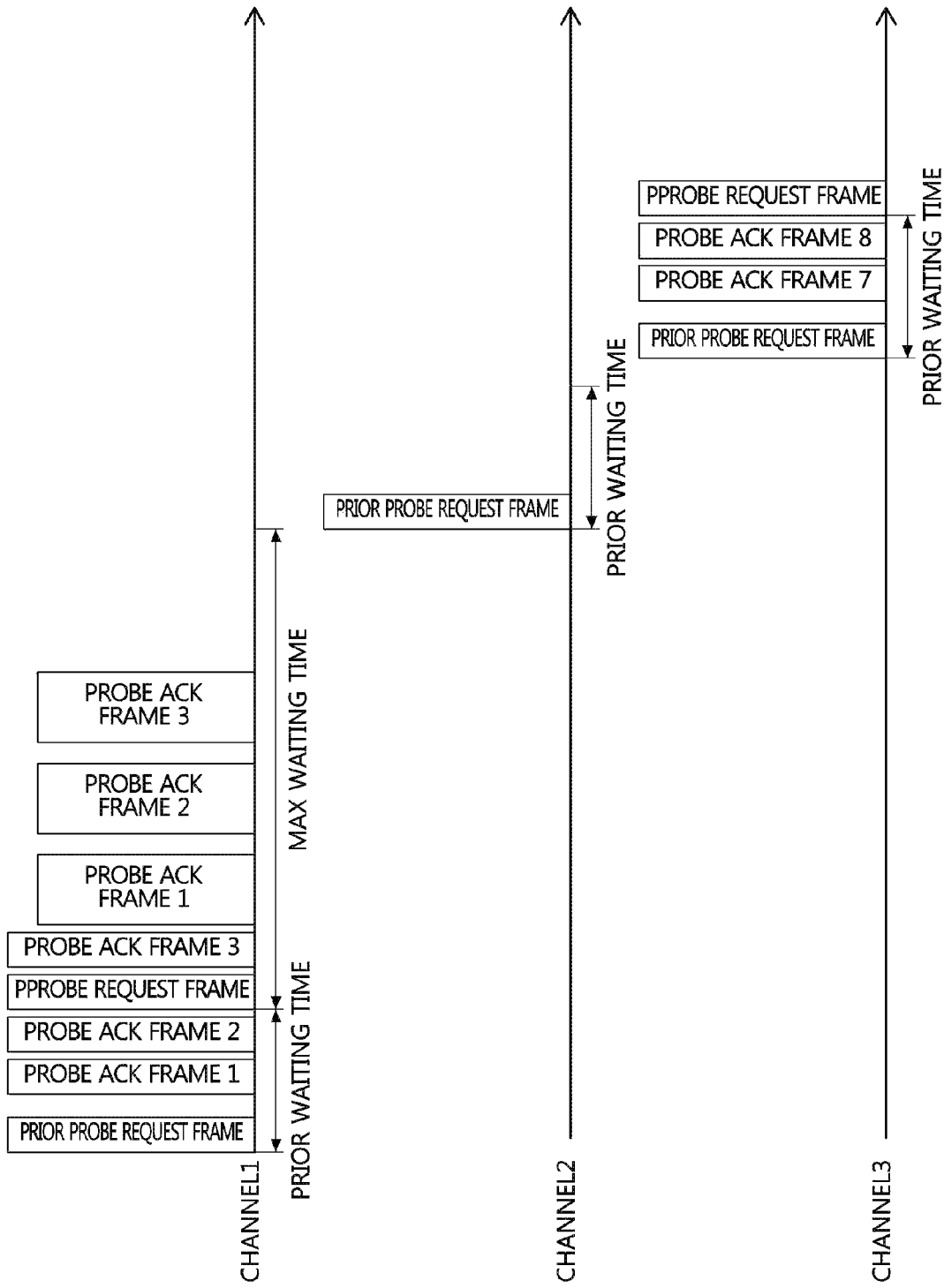
FIG. 13 is a conceptual view showing a third embodiment of an active scanning method.

FIG. 13 is a conceptual view showing a third embodiment of an active scanning method.

Referring to FIG. 13, a terminal may transmit a prior probe request frame on channel 1 and receive a probe ACK frame that is a response to the prior probe request frame for a prior waiting time. In this case, the terminal may set the prior waiting time to be short such that only some probe ACK frames may be received. Accordingly, the terminal may receive two probe ACK frames during the prior waiting time.

The terminal may transmit the probe request frame on channel 1 and receive the probe response frame that is a response to the probe request frame for the set max waiting time. After the max waiting time, the terminal may move to channel 2 and transmit the prior probe request frame.

Since the terminal does not receive the probe ACK frame that is a response to the prior probe request frame for the prior waiting time on channel 2, the terminal may move to channel 3 after the prior waiting time. The terminal may perform the above active scanning process (that is, transmission of prior probe request frame-reception of probe ACK frame-transmission of probe request frame-reception of probe response frame) on channel 3.

Figure 14:
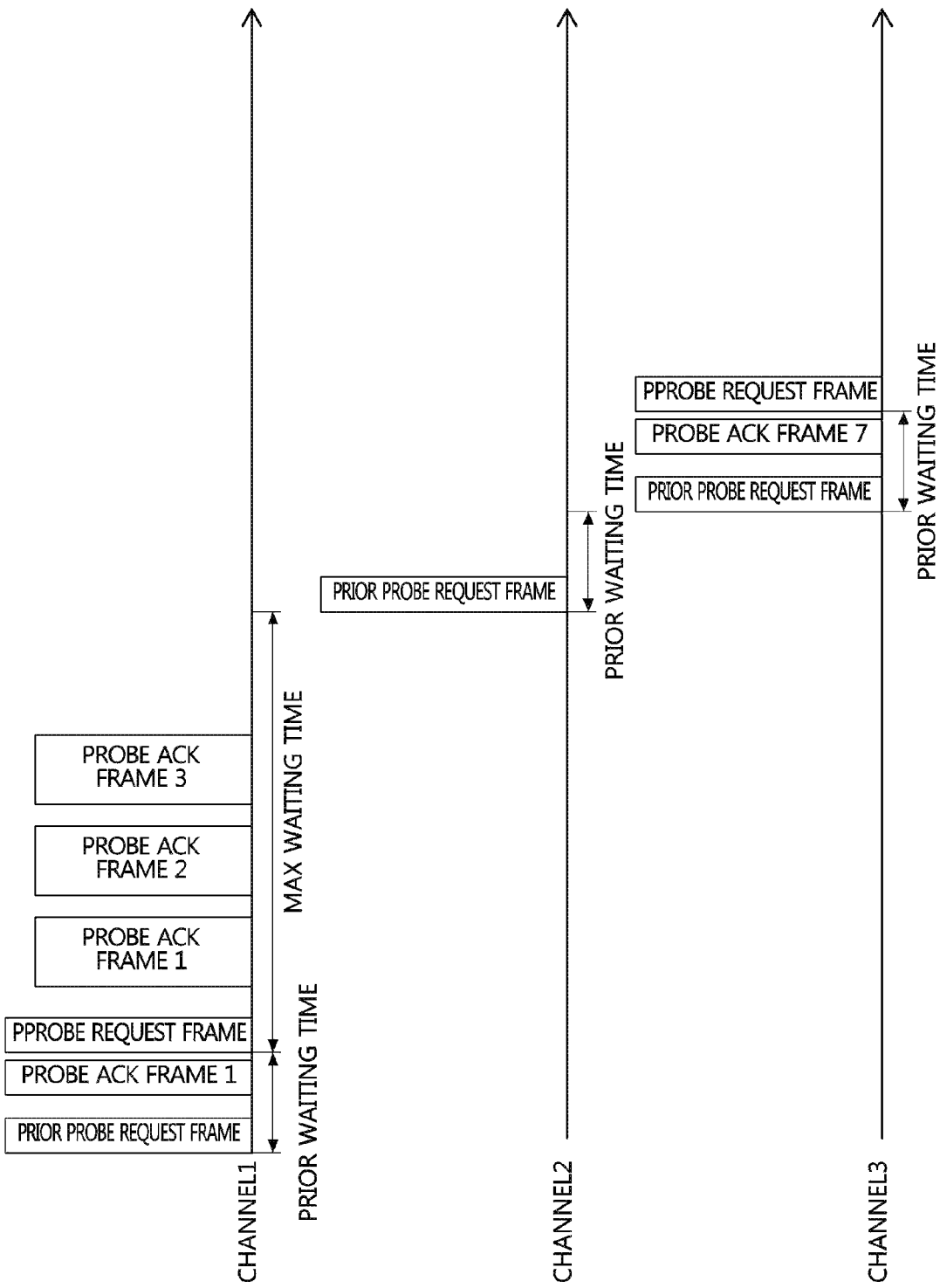
FIG. 14 is a conceptual view showing a fourth embodiment of an active scanning method.

FIG. 14 is a conceptual view showing a fourth embodiment of an active scanning method.

Referring to FIG. 14, a terminal may transmit a prior probe request frame on channel 1 and receive a probe ACK frame that is a response to the prior probe request frame for a prior waiting time.

Here, the prior probe request frame may include transmission mode information that indicates a transmission scheme of the probe ACK frame. The transmission mode information may indicate two transmission modes. A first transmission mode (that is, a mode for checking the number of APs) indicates that all access points that receive the prior probe request frame are required to transmit their own probe ACK frames. A second transmission mode (that is, a mode for checking the presence of APs) indicates that when any access point among the access points that receive the prior probe request frame transmits the probe ACK frame first, the other access points are required to stop transmitting the probe ACK frame.

The transmission mode information may have a size of one bit, where '0' indicates the mode for checking the number of APs and '1' indicates the mode for checking the presence of APs.

Upon receiving the prior probe request frame, the access points that are present on channel 1 may check the transmission mode information included in the prior probe request frame. When the transmission mode information indicates the mode for checking the number of APs, all of the access points that are present on channel 1 may transmit the probe ACK fame that is a response to the prior probe request frame through competition for channel access. Accordingly, the terminal may check the number of access points that are present on channel 1 through the mode for checking the number of APs.

When the transmission mode information indicates the mode for checking the presence of APs, only one access point among the access points that are present on channel 1 may transmit the probe ACK frame that is a response to the prior probe request frame. That is, when one access point among the access points that are present on channel 1 transmits the probe ACK frame, the other access points may stop transmitting the probe ACK frame. Accordingly, the terminal may check whether the access points are present on channel 1 through the mode for checking the presence of APs.

Subsequently, the terminal may transmit the probe request frame on channel 1 and receive the probe response frame that is a response to the probe request frame for the max waiting time. After the max waiting time, the terminal may move to channel 2 and transmit the prior probe request frame.

Since the terminal does not receive the probe ACK frame that is a response to the prior probe request frame for the prior waiting time on channel 2, the terminal may move to channel 3 after the prior waiting time. The terminal may perform the above active scanning process (that is, transmission of prior probe request frame-reception of probe ACK frame-transmission of probe request frame-reception of probe response frame) on channel 3.

Figure 15:
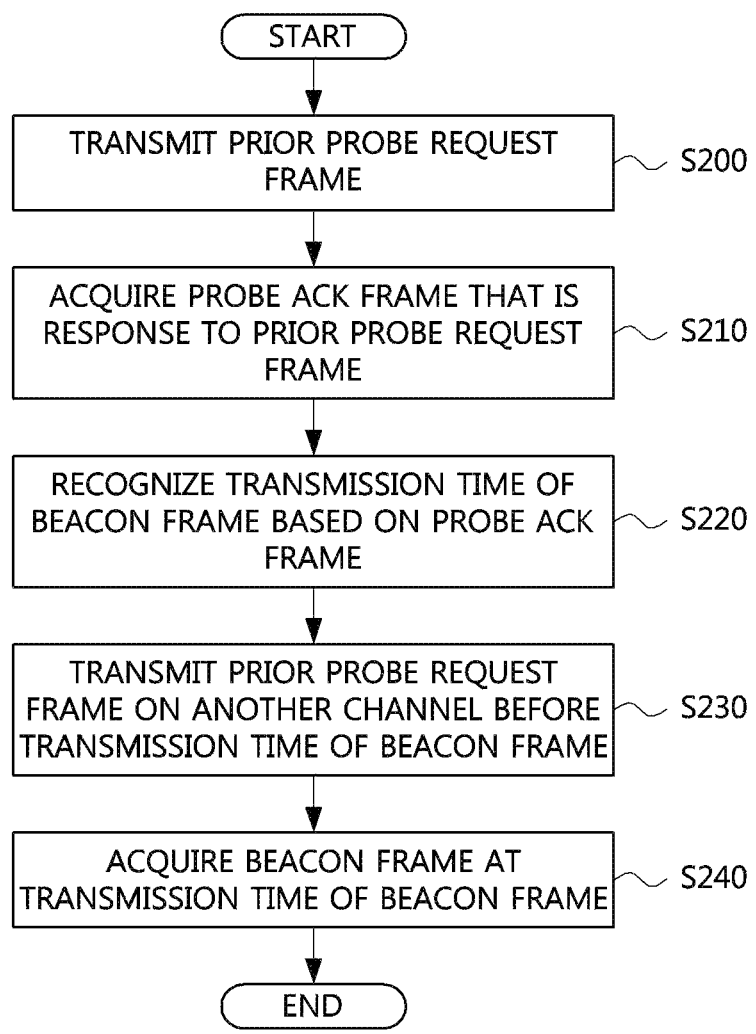
FIG. 15 is a flowchart showing an active scanning method according to another embodiment of the present invention.

FIG. 15 is a flowchart showing an active scanning method according to another embodiment of the present invention.

Referring to FIG. 15, the terminal may transmit a prior probe request frame for checking the presence of the access point through any channel (S200). Here, the prior probe request frame denotes the prior probe request frame that has been described with reference to FIG. 10. That is, the prior probe request frame may be used to check whether the access point is present on the channel or used to request a beacon transmission time.

The prior probe request frame may be simply configured, unlike the existing probe request frame (see FIGS. 5 and 6). For example, the prior probe request frame may include an identifier of a specific access point, or may be configured in the form of a null data packet (NDP) frame.

At least one access point may transmit the probe ACK frame as a response to the prior probe request frame. The access point may generate the probe ACK frame including at least one of its own identifier and transmission time information of a beacon (or an auxiliary beacon) and transmit the generated probe ACK frame.

The terminal may receive the probe ACK frame for a prior waiting time (S210) and acquire transmission time information of a beacon included in the probe ACK frame. In this case, upon receiving a plurality of probe ACK frames, the terminal may select a probe ACK frame having the greatest signal strength from among the plurality of probe ACK frames and acquire the beacon transmission time information from the selected probe ACK frame.

When an active scanning process may be determined to be performed on another channel until the beacon transmission time, the terminal may move to another channel and perform the active scanning process (S230). That is, the terminal may transmit the prior probe request frame on the other channel, receive a probe ACK frame in response to the transmitted prior probe request frame, and acquire transmission time information of a beacon (or auxiliary beacon) from the received probe ACK frame.

The terminal may receive a beacon from the access point at a transmission time of the beacon (S240).

Figure 16:
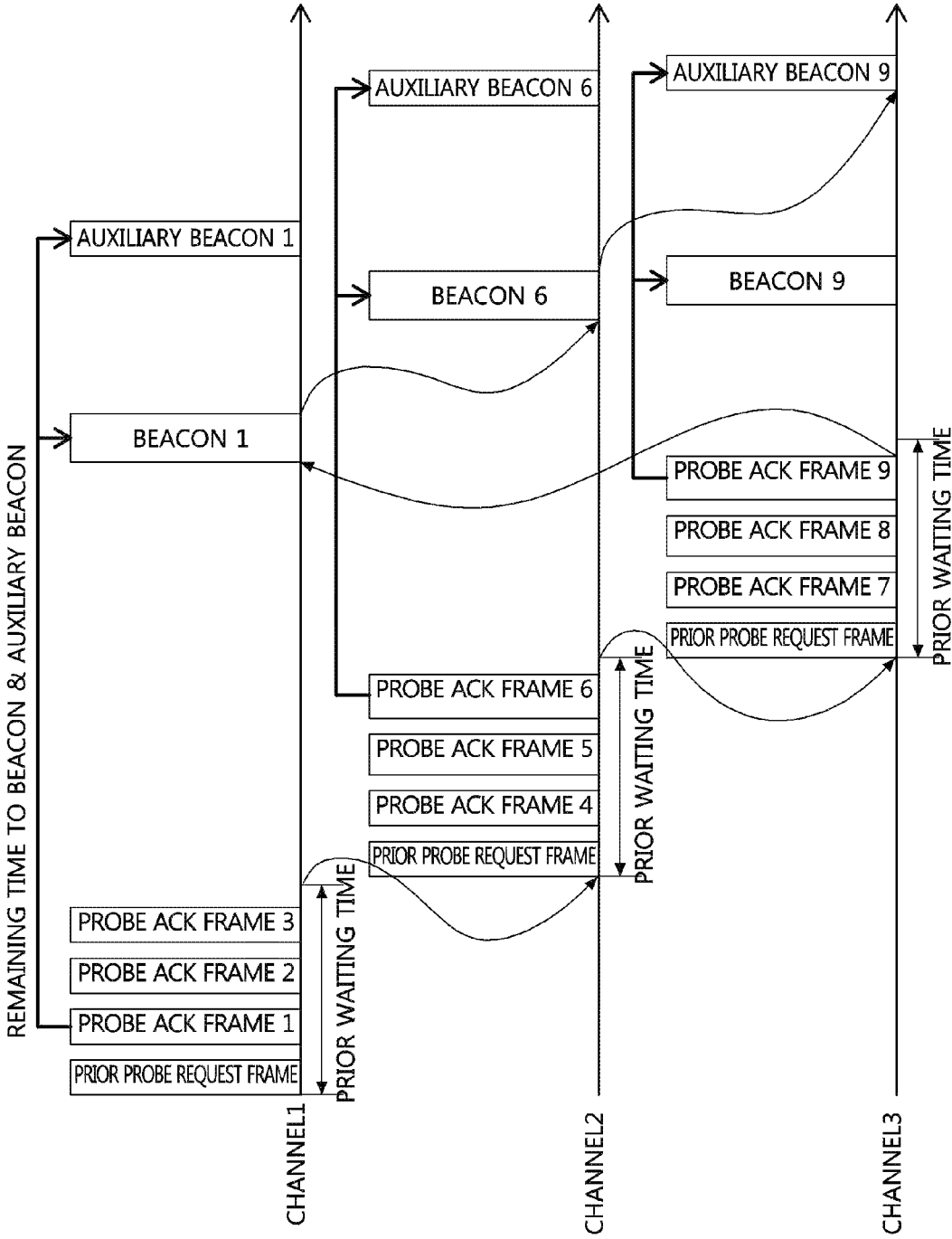
FIG. 16 is a conceptual view showing a fifth embodiment of an active scanning method.

FIG. 16 is a conceptual view showing a fifth embodiment of an active scanning method.

Referring to FIG. 16, the terminal may transmit the prior probe request frame on channel 1. At least one access point may transmit the probe ACK frame as a response to the prior probe request frame, and the terminal may receive the transmitted probe ACK frame for a prior waiting time.

Upon receiving a plurality of probe ACK frames on channel 1, the terminal may select a probe ACK frame having the greatest signal strength from among the plurality of probe ACK frames and may recognize transmission times of a beacon and an auxiliary beacon to be transmitted next based on the beacon transmission time information included in the selected probe ACK frame. For example, when probe ACK frame 1 among the plurality of probe ACK frames has the greatest signal strength, the terminal may acquire transmission times of beacon 1 and auxiliary beacon 1 to be transmitted next based on probe ACK frame 1.

When an active scanning process may be determined to be performed on another channel until the transmission times of beacon 1 and auxiliary beacon 1, the terminal may move to channel 2 and perform the active scanning process. The terminal may transmit the prior probe request frame on channel 2. At least one access point may transmit the probe ACK frame as a response to the prior probe request frame, and the terminal may receive the transmitted probe ACK frame for a prior waiting time.

Upon receiving a plurality of probe ACK frames on channel 2, the terminal may select a probe ACK frame having the greatest signal strength from among the plurality of probe ACK frames and may recognize transmission times of a beacon and an auxiliary beacon to be transmitted next based on the beacon transmission time information included in the selected probe ACK frame. For example, when probe ACK frame 6 among the plurality of probe ACK frames has the greatest signal strength, the terminal may acquire transmission times of beacon 6 and auxiliary beacon 6 to be transmitted next based on probe ACK frame 6.

When an active scanning process may be determined to be performed on another channel until the transmission times of beacon 1, auxiliary beacon 1, beacon 6, and auxiliary beacon 6, the terminal may move to channel 3 and perform an active scanning process. The terminal may transmit the prior probe request frame on channel 3. At least one access point may transmit the probe ACK frame as a response to the prior probe request frame, and the terminal may receive the transmitted probe ACK frame for a prior waiting time.

Upon receiving a plurality of probe ACK frames, the terminal may select a probe ACK frame having the greatest signal strength from among the plurality of probe ACK frames and may recognize transmission times of a beacon and an auxiliary beacon to be transmitted next based on the beacon transmission time information included in the selected probe ACK frame. For example, when probe ACK frame 9 among the plurality of probe ACK frames has the greatest signal strength, the terminal may acquire transmission times of beacon 9 and auxiliary beacon 9 to be transmitted next based on probe ACK frame 9.

When an active scanning process may be determined not to be performed on another channel until the transmission time of the next beacon (that is, beacon 1), the terminal may move to channel 1 and receive beacon 1. Subsequently, since a transmission time of beacon 6 overlaps a transmission time of beacon 9, first, the terminal may receive beacon 6 on channel 2, and then may move to channel 3 and receive auxiliary beacon 9. In contrast, first, the terminal may receive beacon 9 on channel 3 and then may move to channel 2 and receive auxiliary beacon 6. That is, when the beacon transmission time overlap each other, the terminal may determine a beacon reception time in each channel in consideration of the transmission times of the beacon and the auxiliary beacon.

While the example embodiments of the present invention and their advantages have been described in detail, it should be understood that various changes, substitutions and alterations may be made herein without departing from the scope of the invention.

The invention claimed is:

1. A method of performing active scanning by a terminal, the method comprising:
    transmitting a prior probe request frame through a wireless channel; and
    receiving a probe acknowledgement (ACK) frame in response to the prior probe request frame, from at least one access point through the wireless channel,
    wherein the prior probe request frame includes information requesting a next beacon transmission time and information on a service set identifier (SSID), and
    wherein the probe ACK frame includes information on the next beacon transmission time.

2. The method of claim 1, wherein the prior probe request frame is a null data packet (NDP) frame.

3. The method of claim 1, wherein the prior probe request frame includes a Compressed Service Set Identifier (SSID) information of an access point.

4. The method of claim 1, wherein the probe ACK frame includes identifier information of an access point.

5. The method of claim 1, wherein the receiving the probe ACK frame comprises receiving a probe ACK frame that has a signal strength greater than or equal to a predetermined signal strength.

6. The method of claim 1, further comprising waiting for the probe ACK frame on the wireless channel for a ACK response waiting time.

7. The method of claim 6, further comprising scanning a next channel when no probe ACK frame is received on the wireless channel during the ACK response waiting time.

8. The method of claim 1, wherein when the probe ACK frame includes the information on the next beacon transmission time of the access point which has transmitted the probe ACK frame, the terminal receives a beacon from the access point which has transmitted the probe ACK frame at a time indicated by the information on the next beacon transmission time.

9. The method of claim 8, wherein the terminal acquires additional information on the access point which has transmitted the probe ACK frame using the beacon.

10. The method of claim 1,
    wherein, when the probe ACK frame does not include the information on the next beacon transmission time, the method further comprises:
    setting a probe response waiting time;
    transmitting a probe request frame through the wireless channel to an access point which has transmitted the probe ACK frame; and
    receiving a probe response frame from the access point through the wireless channel.

11. The method of claim 10, wherein the probe ACK frame has a shorter length than the probe response frame.

12. A method of responding to active scanning by an access point, the method comprising:
    receiving a prior probe request frame from a terminal through a wireless channel; and
    transmitting a simple response probe acknowledgement (ACK) frame in response to the prior probe request frame through the wireless channel,
    wherein the prior probe request frame includes information requesting a next beacon transmission time and information on a compressed service set identifier (SSID), and
    wherein the simple response probe ACK frame includes information on the next beacon transmission time.

13. The method of claim 12, wherein the prior probe request frame is a null data packet (NDP) frame.

14. The method of claim 12, wherein the prior probe request frame includes a Compressed Service Set Identifier (SSID) information of the access point.

15. The method of claim 12, wherein the simple response probe ACK frame includes identifier information of the access point.

16. The method of claim 12,
    wherein, when simple response probe ACK frame does not include the information on the next beacon transmission time, the method further comprises:
    receiving a probe request frame which is transmitted from the terminal through the wireless channel, when the simple response probe ACK frame is received by the terminal; and
    transmitting a probe response frame in response to the probe request frame through the wireless channel.

17. A terminal for performing active scanning, the terminal comprising:
    a transceiver; and
    a processor,
    wherein the processor is configured to:
    transmit, using the transceiver, a prior probe request frame through a wireless channel; and
    receive, using the transceiver, probe acknowledgement (ACK) frame in response to the prior probe request frame, from at least one access point through the wireless channel,
    wherein the prior probe request frame includes information requesting a next beacon transmission time and information on a compressed service set identifier (SSID), and
    wherein the probe ACK frame includes information on the next beacon transmission time.

18. The terminal of claim 17,
wherein, when the probe ACK frame does not include the information on the next beacon transmission time, the processor is further configured to:
set a probe response waiting time;
transmit, using the transceiver, a probe request frame through the wireless channel to an access point which has transmitted the probe ACK frame; and
receive, using the transceiver, a probe response frame from the access point through the wireless channel.

19. An access point for responding to active scanning, the access point comprising:
a transceiver; and
a processor,
wherein the processor is configured to:
receive, using the transceiver, a prior probe request frame from a terminal through a wireless channel; and
transmit, using the transceiver, a simple response probe acknowledgement (ACK) frame in response to the prior probe request frame through the wireless channel,
wherein the prior probe request frame includes information requesting a next beacon transmission time and information on a compressed service set identifier (SSID), and
wherein the simple response probe ACK frame includes information on the next beacon transmission time.

20. The method of claim 19,
wherein, when the simple response probe ACK frame does not include the information on the next beacon transmission time, the processor is further configured to:
receive, using the transceiver, a probe request frame which is transmitted from the terminal through the wireless channel, when the simple response probe ACK frame is received by the terminal; and
transmit, using the transceiver, a probe response frame in response to the probe request frame through the wireless channel.

\* \* \* \* \*